United States Patent
Miwa

(10) Patent No.: US 8,420,036 B1
(45) Date of Patent: Apr. 16, 2013

(54) CONTROL OF NO/NO2 RATIO TO IMPROVE SCR EFFICIENCY FOR TREATING ENGINE EXHAUST USING BYPASS OXIDATION CATALYST

(75) Inventor: Jason T. Miwa, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 13/539,654

(22) Filed: Jul. 2, 2012

(51) Int. Cl.
*B01D 53/94* (2006.01)
*F01N 3/10* (2006.01)
*F01N 3/18* (2006.01)

(52) U.S. Cl.
USPC ............. 423/213.2; 423/213.5; 423/213.7; 60/282; 60/287; 60/288; 60/299

(58) Field of Classification Search ............. 423/213.2, 423/213.5, 213.7; 60/282, 287, 288, 299
See application file for complete search history.

(56) References Cited

U.S. PATENT DOCUMENTS

2010/0139246 A1* 6/2010 Andersson et al. ............. 60/276
2011/0058999 A1* 3/2011 Ettireddy et al. ........... 423/213.5

OTHER PUBLICATIONS

U.S. Appl. No. 13/656,672, entitled Control of NO/NOx Ratio to Improve SCR Efficiency for Treating Engine Exhaust.

* cited by examiner

*Primary Examiner* — Timothy Vanoy
(74) *Attorney, Agent, or Firm* — Chowdhurt & Georgakis PC; Ann C. Livingston

(57) ABSTRACT

Methods and systems for treating NOx-containing exhaust from an internal combustion engine. An exhaust aftertreatment system has at least a primary oxidation catalyst, a particulate filter, and a selective reduction catalyst (SCR). A bypass line diverts a portion of the exhaust from the exhaust line from a point downstream the particulate filter to a point upstream the SCR. A secondary oxidation catalyst on the bypass line is used to generate NO or NO2 to be returned to the exhaust line upstream the SCR.

20 Claims, 3 Drawing Sheets

CONTROL OF NO/NO2 RATIO TO IMPROVE SCR EFFICIENCY FOR TREATING ENGINE EXHAUST USING BYPASS OXIDATION CATALYST

TECHNICAL FIELD OF THE INVENTION

This invention relates to exhaust aftertreatment of exhaust from diesel (lean burn) engines, and more particularly to aftertreatment of exhaust that contains NOx.

BACKGROUND OF THE INVENTION

Despite new technologies that significantly aid in reducing exhaust emissions from internal combustion diesel engines, NOx and particulate matter (PM) emissions are still a subject of environmental concern. The term "NOx" includes the mono-nitrogen oxides NO and NO2 (nitric oxide and nitrogen dioxide). NOx is a particular concern for diesel engines because of their lean burn operation, but some gasoline engines include lean burn operation as well.

Emission standards for vehicle engines are becoming increasingly stringent, and it is difficult to meet governmental emissions regulations by merely relying only on improvements to the engine itself. Thus, today's engines continue to require some sort of exhaust gas aftertreatment system.

For diesel and other lean burn engines, various exhaust aftertreatment devices have played an essential role in engine emission technologies. Diesel particulate filters (DPF's) are used for particulate matter (PM) control. Selective catalytic reduction (SCR) devices, lean NOx traps and NOx adsorbers are used for NOx control.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to exhaust aftertreatment for reducing NOx emissions. The aftertreatment described herein is especially suitable for diesel internal combustion engines, but may also be suited for lean burn gasoline engines or any other engine that produces NOx in its exhaust. Although the description is in terms of an exhaust aftertreatment system of a type used for automotive vehicles, the exhaust aftertreatment system may be used to treat exhaust from any type of lean burn engine.

As indicated in the Background, many modern diesel internal combustion engines use selective catalytic reduction (SCR) devices for NOx reduction. An SCR device uses a catalyst to convert NOx into nitrogen (N2) and water (H2O). A reductant, such as anhydrous ammonia, aqueous ammonia or urea, is added to the exhaust gas to activate the catalyst, typically by means of an injector upstream the SCR device. It is desired that the NOx conversion efficiency of the SCR device as high as possible.

A feature of the systems and methods described herein is the recognition that the NOx conversion efficiency of an SCR device is a strong function of the NO/NOx ratio in the exhaust stream that enters the SCR (sometimes referred to herein as the "feedgas"). The following description is directed to controlling the NO/NOx ratio of the feedgas so that NOx reduction efficiency is maximized. This control is achieved in real time or near real time.

It should be understood that NOx is the sum of NO+NO2. Thus, for example, when the NO/NO2 ratio equals 1 this is the same as when the NO/NOx ratio equals 0.5.

Figure 1:
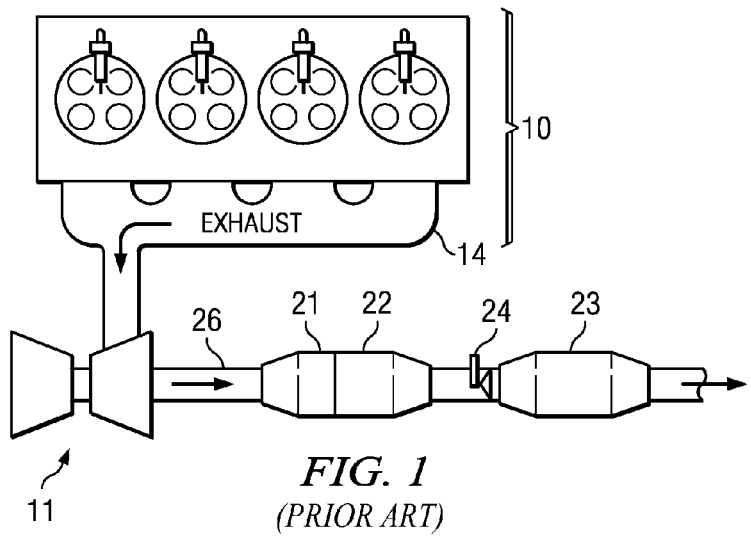
FIG. 1 illustrates an engine whose exhaust is delivered to a conventional SCR-based exhaust aftertreatment system.

FIG. 1 illustrates an engine 10 whose exhaust is delivered to a conventional SCR-based exhaust aftertreatment system. In the illustrative embodiment, engine 10 is a diesel engine of an automotive type vehicle, and is an air-boosted engine having a turbocharger 11. The engine's intake air is compressed by the turbocharger's compressor, which is mechanically driven by its turbine. Exhaust gas is discharged from the engine's exhaust manifold 14 to a main exhaust line 26.

The flow of exhaust through the exhaust line 26 and through the elements of the aftertreatment system is indicated by the arrows. The main exhaust line 26 is equipped with an upstream oxidation catalyst (often referred to as a diesel oxidation catalyst or DOC) 21. Next (downstream) is a diesel particulate filter (DPF) 22. In the example of this description, DOC 21 and DPF 22 are housed in the same housing, but that need not be always the case.

The term "diesel particulate filter" as used herein is not limited to filters used for diesel engines, and may include various types of particulate filters. The DPF 22 may be catalyzed, which permits it to passively regenerate. The regeneration results from chemical reaction of the DPF catalyst, which raises the temperature within the DPF high enough to oxidize PM collected in the DPF.

Next in line is a selective catalytic reduction (SCR) device 23. As stated above, SCR 23 uses a catalyst to convert NOx into nitrogen (N2) and water. A reductant is added to the exhaust gas by means of an injector 24 upstream the entrance to the SCR device 23. SCR device 23 may be manufactured from various ceramic materials used as a carrier, such as titanium oxide. The catalytic components are usually oxides of base metals (such as vanadium and tungsten), zeolites, or various precious metals.

In the example of this description, SCR 23 uses ammonia (from urea) to selectively reduce NOx into N2 and water. There are three main reactions that may occur in an SCR catalyst:

$$4NH_3 + 2NO + 2NO_2 \rightarrow 4N_2 + 6H_2O \tag{1}$$

$$4NH_3 + 4NO + O_2 \rightarrow 4N_2 + 6H_2O \tag{2}$$

$$4NH_3 + 2NO2 + O_2 \rightarrow 3N_2 + 6H_2O \tag{3}$$

Reaction (1) is considered the "fast-SCR" reaction, and is the most desirable reaction because it occurs much faster than Reaction (2), referred to herein as the "standard" SCR reaction. However the "fast-SCR" reaction requires a 1:1 ratio of NO and NO2, which is not what is typically emitted from the engine. Reaction (3) is the slowest and least desirable reaction and is typically avoided.

Diesel engines typically produce NOx that has an NO2 content of between 5% and 20%, with the rest being NO. If the feedgas to the SCR device 23 is left unchanged, the standard SCR reaction (Reaction (2)) is the predominant reaction, and the SCR's NOx conversion efficiency at low temperatures is less than desirable.

DOC 21 improves the NOx conversion efficiency of the SCR device 23. Specifically, it oxidizes part of the NO in the engine-out exhaust into NO2 to improve the NO/NO2 ratio into the SCR device 23.

The effectiveness of DOC 21 to convert NO to NO2 is dependent on its catalyst activity level, the temperature of the feedgas into the DOC, the space velocity of the feed gas and other factors. The catalyst activity of the DOC is affected by modifying the platinum group metal (PGM) content of the wash coat. In general, as the PGM content increases, NO oxidation starts at lower temperatures and the peak conversion of NO to NO2 increases.

Figure 2:
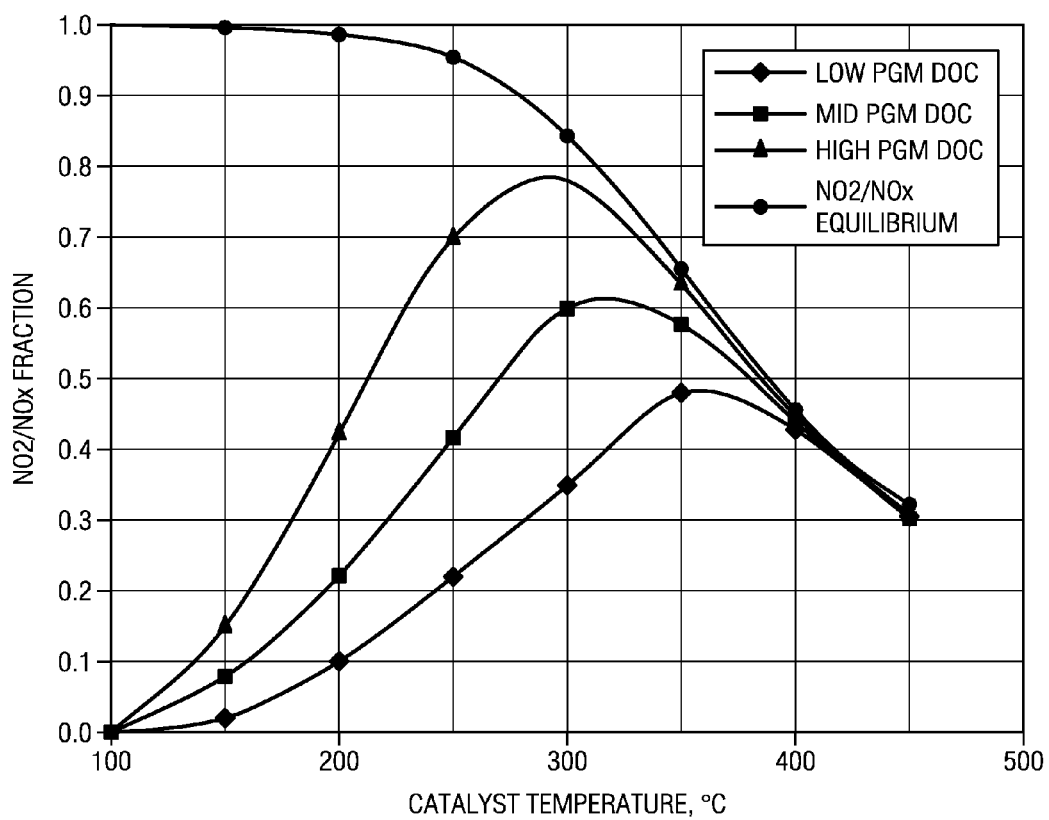
FIG. 2 illustrates, for an example DOC, the effect of its PGM content on the NO2/NOx ratio of the exhaust gas out from the DOC.

FIG. 2 illustrates, for an example DOC, the effect of its PGM content on the NO2/NOx ratio of the exhaust gas out from the DOC. At high temperatures, the DOC's reaction is limited by an NO2/NOx equilibrium line, shown as a dotted line. At low temperatures, a DOC's ability to produce NO2 is highly desirable to improve the SCR's reaction speed during cold start and other operating conditions where the aftertreatment system is at lower temperatures.

The use of more PGM provides increased catalyst activity (in terms of NO2 production) at low temperatures. However, this increased catalyst activity also has a much higher peak NO2 production, causing excess NO2 at the moderate temperatures at which the DOC is normally operated. The excess NO2 is reliant on the slower "NO2 only" SCR reaction, which can lead to decreased $NO_x$ conversion efficiency of the SCR device 23. NO2 is a lung irritant, and as such, the percentage of NOx emitted as NO2 is regulated.

Thus, conventionally, due to a trade-off at moderate temperatures and NO2 regulation, the DOC formulation that is selected is a low PGM DOC. The low PGM minimizes the likelihood of excess NO2 but sacrifices good low temperature performance.

Figure 3:
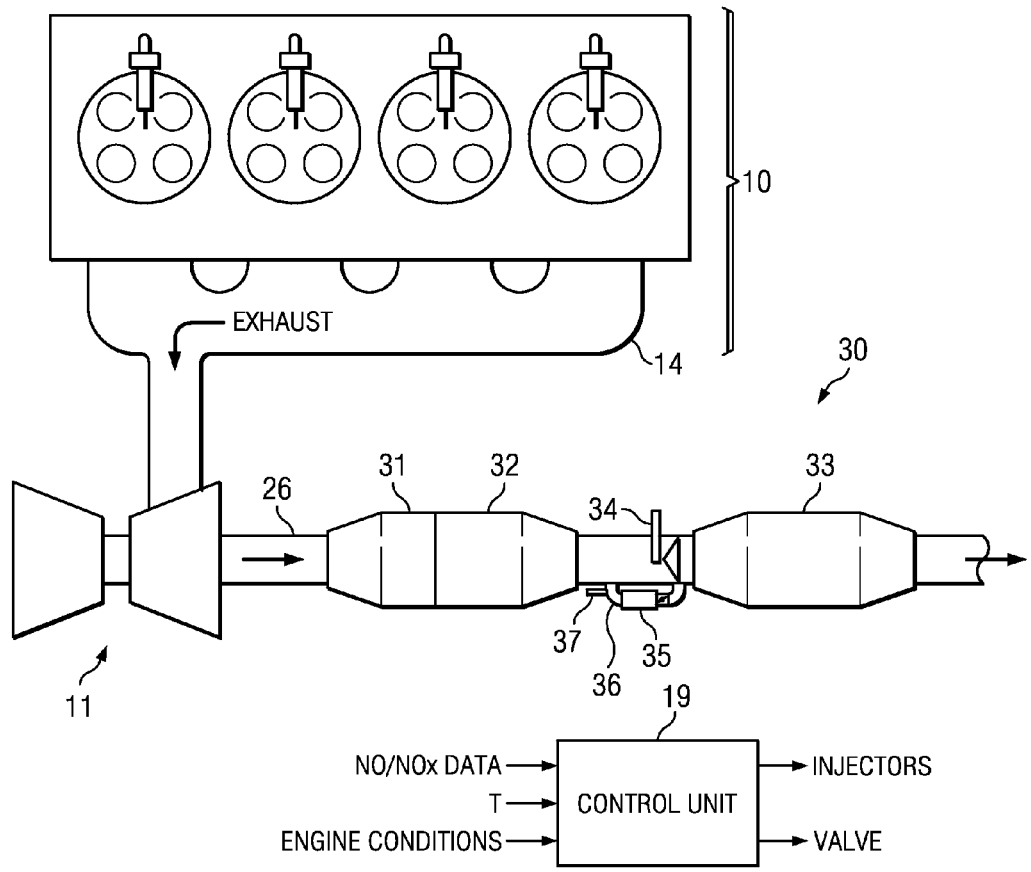
FIG. 3 illustrates an exhaust aftertreatment system that allows the use of a high PGM DOC and also controls the NO/NO2 ratio into its SCR device.

FIG. 3 illustrates an exhaust aftertreatment system 30 that allows the use of a high PGM DOC 31 and also controls the NO/NO2 ratio into the SCR device 33. The DOC 31 may have a mid-level or high PGM formulation, meaning that it produces exhaust gas having peak NO2/NOx ratios above or greater than 0.5, as shown by the temperature profiles illustrated in FIG. 2. In this configuration, DOC 31 may be referred to as the "primary" or "upstream" oxidation catalyst to distinguish it from a smaller downstream oxidation catalyst described below.

A small bypass line 36 is installed between the outlet of the DPF 32 and the inlet of the SCR device 33, such that it diverts a portion of the exhaust that would otherwise flow directly through the main exhaust line out of the DPF 32 into the SCR 33. A small oxidation catalyst 35, is installed on this bypass line 36. An injector 37 provides ammonia (or other reductant), which is oxidized in the oxidation catalyst 35 to create NO.

As explained below, the NO produced by this secondary oxidation catalyst 35 may be used to offset high NO2 concentrations from the high PGM DOC 31. The injection of ammonia into catalyst 35 can be actively controlled to provide a desired amount of NO. This NO is then used to adjust the NO/NO2 ratio on a real-time basis.

Figure 4:
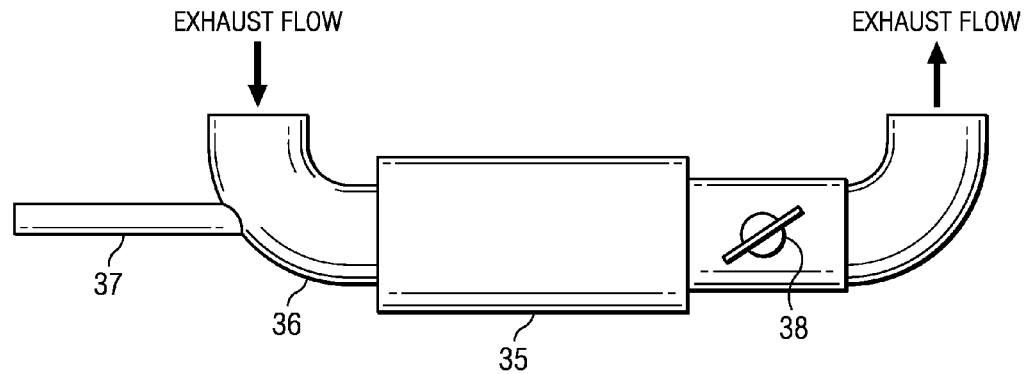
FIG. 4 illustrates the bypass line of the system of FIG. 3 in further detail.

FIG. 4 illustrates the bypass line 36, oxidation catalyst 35 and injector 37 in further detail. The amount of flow into the bypass line 36 and across the small oxidation catalyst 35 can be controlled by installing a small valve 37 (optional). Valve 37 may be implemented with a throttle valve or small poppet type valve or other similar means.

In operation, part of the exhaust flow from the DPF 32 can be diverted into bypass line 36, through the secondary oxidation catalyst 35, and into the SCR device 33. Because the performance of the reductant-to-NO conversion process is temperature dependant, the temperature of oxidation catalyst 35 could be increased by installing a heater (not shown), utilizing a heated metal substrate or other similar means. Alternatively, oxidation catalyst 35 could be cooled via increased surface area, increased airflow across it or other means of improving the convective heat transfer out of it. With these methods, the space velocity and temperature of the oxidation catalyst 35 can be controlled to achieve a desired amount of NO.

The amount of reductant into the bypass line 36 may be controlled by use of an injector 37 upstream of the small oxidation catalyst 35. In some embodiments, the main injector 34 could be used to provide reductant to the secondary oxidation catalyst 35 as well as to the SCR device 23. For example, the flow split into bypass line 36 could be placed downstream of the main injector 34.

The object of one method of using a system such as that of FIGS. 3 and 4 is to alter the NO/NO2 ratio during conditions where more NO or NO2 would promote the "fast-SCR" reaction in the SCR device 33. The desired ratio of NO/NO2 entering the SCR device 33 for a given condition could be determined based on stored data.

The secondary oxidation catalyst 35 can change the ratio of NO/NO2 by several methods. One method is by further oxidizing NO in the exhaust into NO2. This reaction can be promoted in some instances by increasing the temperature of the secondary oxidation catalyst 35.

Another method of using secondary oxidation catalyst 35 to affect the NO/NO2 ratio is to inject a reductant across catalyst 35. The reductant will be oxidized into NO or NO2 depending on temperature and space velocity conditions.

Figure 5:
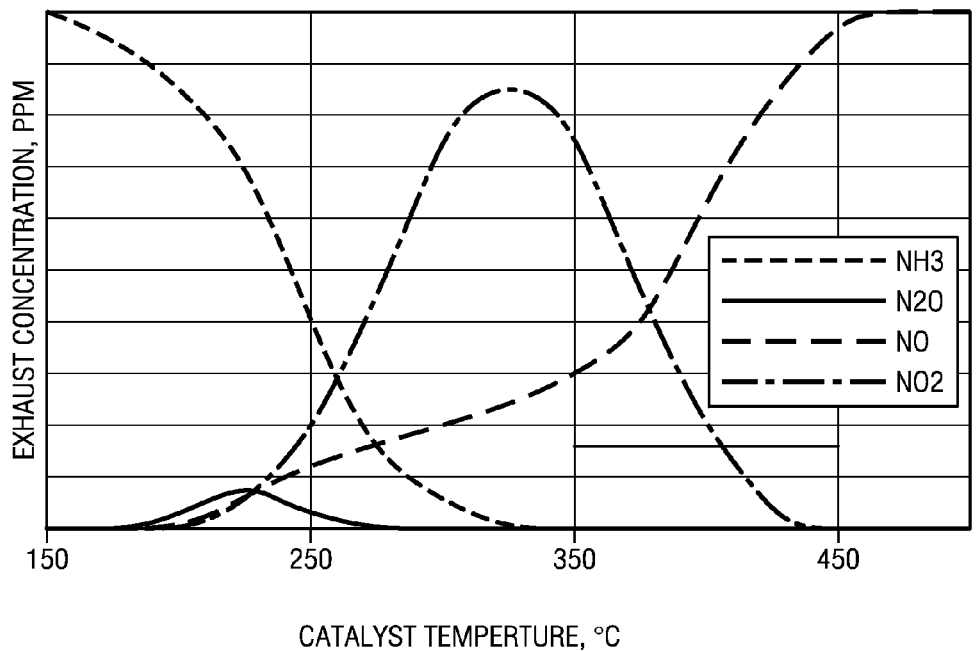
FIG. 5 illustrates, for an example oxidation catalyst, the concentration of various exhaust gas components out of the catalyst as a function of temperature.

FIG. 5 illustrates an example of ammonia (NH3) oxidation across an oxidation catalyst, such as catalyst 35. It can be clearly seen that depending on the catalyst temperature, ammonia could be mostly oxidized to NO or NO2.

Another feature of the system of FIGS. 3 and 4 is that the majority of hydrocarbon in the exhaust is oxidized upstream of the secondary oxidation catalyst 35. As a result, the effect of HC reduction of NO2 in the secondary oxidation catalyst 35 is greatly reduced.

Referring again to FIG. 3, control unit 19 may be processor-based, programmed to control various aspects of engine operation. In general, control unit 19 may be implemented with various controller devices known or to be developed. Further, control unit 19 may be part of a more comprehensive engine control unit that controls various other engine and/or emissions devices.

Control unit 19 is programmed to receive input signals and provide control signals, to implement the method described below. In particular, control unit 19 may receive one or more measurement signals, referred to as NO/NO2 data, that allow it to determine the current NO/NO2 ratio of the engine-out exhaust or the exhaust entering the SCR device or both. The NO or NO2 content of the exhaust could be directly measured or estimated from other measured data.

Control unit 19 (which may be part of a larger engine control system) determines a desired NO/NO2 ratio, and delivers control signals that allow control of the NO/NO2 ratio into SCR device 33. These control (output) signals include control of the elements related to the bypass line 36, such as for control of injector 37 and valve 38 or heating and cooling mechanisms. It may also perform other tasks related to the aftertreatment system, such as control of the main injector 34.

For controlling the NO/NOx ratio, measurement of NO and NO2 using special sensors (not shown) would be a "direct" way to provide control unit 19 with appropriate input data. However, lacking such sensors, the method may be implemented by programming control unit 19 to perform a model-based control strategy. Various "NO and NO2 input data" can be used to estimate the current NO/NOx ratio. Stored data may be used to map current engine conditions to an optimum NO/NO2 ratio and a desired NO output to be provided by the secondary oxidation catalyst 35. This in turn determines parameters such as the amount of reductant provided to the secondary oxidation catalyst 35 and the amount of exhaust gas to be provided to the bypass line 36. This data is used to generate appropriate control signals to injector 37 and valve 38.

Figure 6:
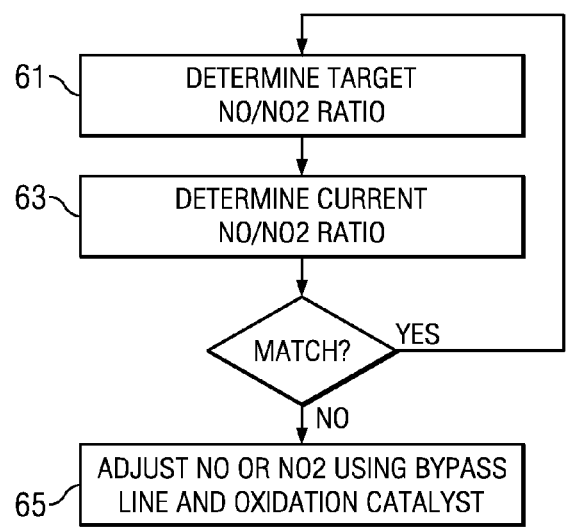
FIG. 6 illustrates a method of adjusting the NO entering an SCR, using a bypass line and oxidation catalyst upstream the SCR.

FIG. 6 illustrates a method of controlling the NO/NO2 ratio in the exhaust delivered to an SCR in accordance with the above description. It is assumed that the exhaust aftertreatment system has at least an primary oxidation catalyst, an SCR, and a bypass line with a secondary oxidation catalyst, such as the corresponding elements shown in FIG. 3. An advantage of the method is that a primary oxidation catalyst having a mid-level or high PGM content can be used because if the NO2 peak levels are high, the NO/NO2 ratio can be balanced by increasing the NO into the SCR device.

Step 61 is determining a target NO/NO2 ratio for exhaust entering the SCR. Typically, this ratio will be 1:1, but that particular ratio is not necessary to the method. The target ratio could be a function of engine operating conditions or conditions associated with the aftertreatment system, such as temperature, and could be determined from stored data accessed by the control unit.

Step 63 is determining the current NO/NO2 ratio of exhaust entering the SCR. As explained above, various factors, especially the temperature of the primary oxidation catalyst 31, can affect the NO2 content of the exhaust.

If an adjustment is needed, Step 65 is adjusting the NO/NO2 ratio by adjusting the NO or NO2 concentration of exhaust generated by the secondary oxidation catalyst 35. As explained above, the bypass line 36 can be controlled to affect the amount of NO and/or NO2 it returns into the exhaust line immediately upstream the SCR device 33. More or less reductant can be provided to the secondary oxidation catalyst, more or less exhaust gas can be diverted into the bypass line, and/or the temperature of the secondary oxidation catalyst 35 can be adjusted.

What is claimed is:

1. A method of treating exhaust from an engine, the exhaust containing NOx, the NOx comprising at least nitrogen monoxide (NO), comprising:
providing an exhaust aftertreatment system having at least the following devices arranged in the following order on an exhaust line: a primary oxidation catalyst, a particulate filter, and a selective reduction catalyst (SCR);
using a bypass line to divert a portion of the exhaust from the exhaust line from a point downstream the particulate filter to a point upstream the SCR; and
installing a secondary oxidation catalyst on the bypass line; and
providing the secondary oxidation catalyst with a reductant; and
wherein an amount of reductant provided to the secondary oxidation catalyst determines an amount of NO to be generated by the secondary oxidation catalyst and returned to the exhaust line upstream the SCR.

2. The method of claim 1, wherein the amount of reductant provided to the secondary oxidation catalyst is varied by means of an injector.

3. The method of claim 2, wherein the injector is the same injector as used to provide a reductant to the SCR.

4. The method of claim 2, wherein the injector is a different injector from that used to provide a reductant to the SCR.

5. The method of claim 1, wherein the exhaust in the main exhaust line contains NO2 and wherein the amount of NO results in exhaust entering the SCR with a NO/NO2 ratio of 1:1.

6. The method of claim 1, wherein the exhaust in the main exhaust line contains NO2, and further comprising adjusting the reductant provided to the bypass line, thereby providing a target NO/NO2 ratio.

7. The method of claim 1, wherein the exhaust in the main exhaust line contains NO2, and further comprising adjusting the amount of exhaust flowing through the bypass line, thereby providing a target NO/NO2 ratio.

8. The method of claim 1, wherein the exhaust in the main exhaust line contains NO2, and further comprising adjusting the temperature of the secondary oxidation catalyst, thereby providing a target NO/NO2 ratio.

9. The method of claim 1, wherein the primary oxidation catalyst has a PGM (platinum group metal) content such that exhaust exiting the primary oxidation catalyst has a peak NO2/NOx ratio over 0.5.

10. The method of claim 1, further comprising adjusting the temperature of the secondary oxidation catalyst.

11. The method of claim 1, further comprising adjusting the amount of exhaust entering the bypass line.

12. A system for treating exhaust from an engine, the exhaust containing NOx, the NOx comprising at least nitrogen monoxide (NO), comprising:
an exhaust aftertreatment system having at least the following devices arranged in the following order on an exhaust line: a primary oxidation catalyst, a particulate filter, and a selective reduction catalyst (SCR);
a bypass line configured to divert a portion of the exhaust from the exhaust line from a point downstream the particulate filter to a point upstream the SCR; and
a secondary oxidation catalyst installed on the bypass line;
wherein the secondary oxidation catalyst is operable to receive a reductant and to generate an amount of NO or NO2 in the exhaust returning to the exhaust line and entering the SCR.

13. The system of claim 12, further comprising an injector for delivering reductant to the secondary oxidation catalyst.

14. The system of claim 13, wherein the injector also delivers reductant to the primary oxidation catalyst.

15. The system of claim 13, further comprising a control unit programmed to determine an amount of NO or NO2 to be generated by the secondary oxidation catalyst, and to deliver a control signal to the injector to control the amount of reductant delivered to the secondary oxidation catalyst.

16. The system of claim 12, wherein the bypass line has a valve, and further comprising a control unit programmed to determine an amount of NO or NO2 to be generated by the secondary oxidation catalyst, and to deliver a control signal to the valve to control the amount of exhaust flowing through the bypass line.

17. The system of claim 12, further comprising a control unit programmed to determine an amount of NO or NO2 to be generated by the secondary oxidation catalyst, and to deliver a control signal to control the temperature of exhaust flowing through the secondary oxidation catalyst.

18. The system of claim 12, further comprising a control unit programmed to determine an amount of NO or NO2 to be generated by the secondary oxidation catalyst, and to deliver a control signal to control one or more of the following: the amount of reductant provided to the secondary oxidation catalyst, the amount of exhaust flowing through the bypass line or the temperature of exhaust flowing through the secondary oxidation catalyst.

19. The system of claim 12, wherein the primary oxidation catalyst has a PGM (platinum group metal) content such that exhaust exiting the primary oxidation catalyst has a peak NO2/NOx ratio over 0.5.

20. A method of treating exhaust from an engine, the exhaust containing NOx, the NOx comprising at least nitrogen monoxide (NO), comprising:

providing an exhaust aftertreatment system having at least the following devices arranged in the following order on an exhaust line: a primary oxidation catalyst, a particulate filter, and a selective reduction catalyst (SCR);

using a bypass line to divert a portion of the exhaust from the exhaust line from a point downstream the particulate filter to a point upstream the SCR; and installing a secondary oxidation catalyst on the bypass line; and providing the secondary oxidation catalyst with a reductant; and wherein the secondary oxidation catalyst generates NO or NO2 to be returned to the exhaust line upstream the SCR; and wherein the amount of NO or NO2 generated by the secondary oxidation catalyst is controlled by one or more of the following: the amount of exhaust flowing through the bypass line, an amount of reductant provided to the secondary oxidation catalyst, or the temperature of the oxidation catalyst.

* * * * *